US010248419B2

(12) United States Patent
Derby et al.

(10) Patent No.: US 10,248,419 B2
(45) Date of Patent: Apr. 2, 2019

(54) IN-MEMORY/REGISTER VECTOR RADIX SORT

(71) Applicant: International Business Machines Corporation, Armonk, NY (US)

(72) Inventors: Jeffrey H. Derby, Research Triangle Park, NC (US); Robert Montoye, Yorktown Heights, NY (US); Dheeraj Sreedhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/065,111

(22) Filed: Mar. 9, 2016

(65) Prior Publication Data

US 2017/0262211 A1 Sep. 14, 2017

(51) Int. Cl.

*G06F 12/00* (2006.01)
*G06F 9/30* (2018.01)
*G06F 12/0804* (2016.01)
*G06F 12/0862* (2016.01)

(52) U.S. Cl.

CPC ...... *G06F 9/30072* (2013.01); *G06F 9/30032* (2013.01); *G06F 9/30036* (2013.01); *G06F 12/0804* (2013.01); *G06F 12/0862* (2013.01); *G06F 2212/6028* (2013.01)

(58) Field of Classification Search

CPC .... G06F 3/0638; G06F 3/0604; G06F 3/0656; G06F 3/0673; G06F 9/30036; G06F 9/30072

See application file for complete search history.

(56) References Cited

U.S. PATENT DOCUMENTS 5,440,734 A 8/1995 Wager
5,924,091 A 7/1999 Burkhard
7,624,107 B1 11/2009 LeGrand
7,680,791 B2 3/2010 Callaghan et al.
2002/0103965 A1* 8/2002 Dawkins .............. G06F 12/122 711/113
2002/0103975 A1* 8/2002 Dawkins .............. G06F 12/122 711/133

(Continued)

OTHER PUBLICATIONS

Chhugani et al. Efficient Implementation of Sorting on Multi-core SIMD CPU Architectures, VLDB, 2008.

(Continued)

*Primary Examiner* — Prasith Thammavong
(74) *Attorney, Agent, or Firm* — Ryan, Mason & Lewis, LLP

(57) ABSTRACT

Methods, systems and computer program products for accelerating sorting of data are provided herein. A computer-implemented method includes retrieving a plurality of cache lines of data from an input buffer, wherein each cache line comprises a plurality of elements, scattering the plurality of elements of each retrieved cache line into a plurality of bins, wherein said scattering comprises using one or more vector instructions, forming a bin cache line in a corresponding one of the plurality of bins, wherein the bin cache line comprises a group of the plurality of elements which were scattered to the corresponding one of the plurality of bins, writing the bin cache line from the corresponding one of the plurality of bins to a memory, and loading the bin cache line from the memory to the input buffer.

17 Claims, 10 Drawing Sheets

(56) References Cited

U.S. PATENT DOCUMENTS

2003/0122836 A1* 7/2003 Doyle ...................... G06T 1/60 345/559
2005/0060494 A1* 3/2005 Desai ................. G06F 12/0802 711/118
2007/0094477 A1* 4/2007 Espasa ............... G06F 12/0844 711/217
2009/0172364 A1* 7/2009 Sprangle ............ G06F 9/30043 712/225
2009/0249026 A1* 10/2009 Smelyanskiy ...... G06F 9/30032 712/4
2009/0276428 A1 11/2009 Anh et al.
2011/0138122 A1* 6/2011 Hughes ............... G06F 12/0802 711/117
2012/0144089 A1* 6/2012 Hall ....................... G06F 12/08 711/3
2013/0080737 A1* 3/2013 Reid ........................ G06F 8/45 712/4
2013/0326160 A1* 12/2013 Sperber ............... G06F 9/30036 711/154
2014/0188906 A1 7/2014 Muller et al.
2015/0074373 A1* 3/2015 Sperber ............... G06F 9/30145 712/7
2015/0186183 A1* 7/2015 Vasudevan .......... G06F 9/30043 718/103
2016/0019184 A1* 1/2016 Hughes .................... G06F 9/30 711/122

OTHER PUBLICATIONS

P.M. McIlroy, et al. Engineering Radix Sort, Computing Systems, 6:5-27, 1993.

Paradis, Efficient Parallelization of InplaceRadix Sort. Minsik Cho et al. IBM, Proceedings of the VLDB Endowment, vol. 8, No. 12, 2015, pp. 1-12.

Inoue et al., SIMD- and Cache-Friendly Algorithm for Sorting and Array of Structures, 41st International Conference on Very Large Data Bases, Aug. 1- Sep. 4, 2015, Kohala Coast, Hawaii.

Polychroniou et al. A Comprehensive Study of Main-Memory Partitioning and its Application to Large-Scale Comparison-and Radix-Sort, SIGMOD'14, Jun. 22-27, 2014, Snowbird, UT, USA.

Wikipedia, Branch Predication, https://en.wikipedia.org/wiki/Branch_predication, Jan. 21, 2016, pp. 1-6.

Wikipedia, Radix Sort, https://en.wikipedia.org/wiki/Radix_sort, Feb. 25, 2016, pp. 1-23.

* cited by examiner

1vblk64g8 VRTc, VRB

| 31 | VRTc | /// | VRB |
|---|---|---|---|
| 0 | 6 | 11 | 16 |

The specified operation is:

```
Vx ← get_map_entry (VRTc, 'VC')
Vx ← Vx & 0xFE00
Vy ← get_map_entry (VRB, 'VB')
do i = 0 to 255 by 64
    b ← VSR [Vy]_{i : i+63}
    if b = 0xffffffffffffffff then
        VSR [Vx]_{0 : 255} ← 0
        VSR [Vx+1]_{0 : 255} ← 0
    else
        EA ← b & 0xffffffffffffffc0
        VSR [Vx] ← MEM [EA, 32]
        VSR [Vx+1] ← MEM [EA+ 32, 32]
Vy = Vy + 1
do i = 0 to 255 by 64
    b = VSR [Vy]_{i : i+63}
    if b = 0xffffffffffffffff then
        VSR [Vx]_{0 : 255} ← 0
        VSR [Vx+1]_{0 : 255} ← 0
    else
        EA ← b & 0xffffffffffffffc0
        VSR [Vx] ← MEM [EA, 32]
        VSR [Vx+1] ← MEM [EA+ 32, 32]
```

VRTc : Pointers to loaded cache lines
VRB : Pointers to cache lines with all ones implying to the predication VRB — Array of Cache lines locations VRTc — Array of memory Locations with all 0xf Indicating predication A maximum of 8 cache lines are loaded simultaneously

FIG. 4

The proposed format is:

stvblk64g8 VRSc, VRB

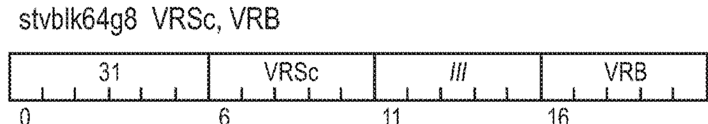

The specified operation is:

```
Vx ← get _map_entry (VRSc, 'VC')
Vx ← Vx & 0xFE00
Vy ← get _map_entry (VRB, 'VB')
do i = 0 to 255 by 64
     b ← VSR [Vy]i : i + 63
     if b ≠ 0xf f f f f f f f f f f f f f f f then
          EA ← b & 0xf f f f f f f f f f f f f f fc0
          MEM [EA, 32] ← VSR [Vx]
          MEM [EA+ 32, 32] ← VSR [Vx + 1]
Vy = Vy + 1
do i = 0 to 255 by 64
     b = VSR [Vy]i : i + 63
     if b ≠ 0xf f f f f f f f f f f f f f f f then
          EA ← b & 0xf f f f f f f f f f f f f f fc0
          MEM [EA, 32] ← VSR [Vx]
          MEM [EA+ 32, 32] ← VSR [Vx + 1]
```

VRB : Pointers to cachelines in register
VRSc : Pointers to cachelines in registers with all ones implying to the predication

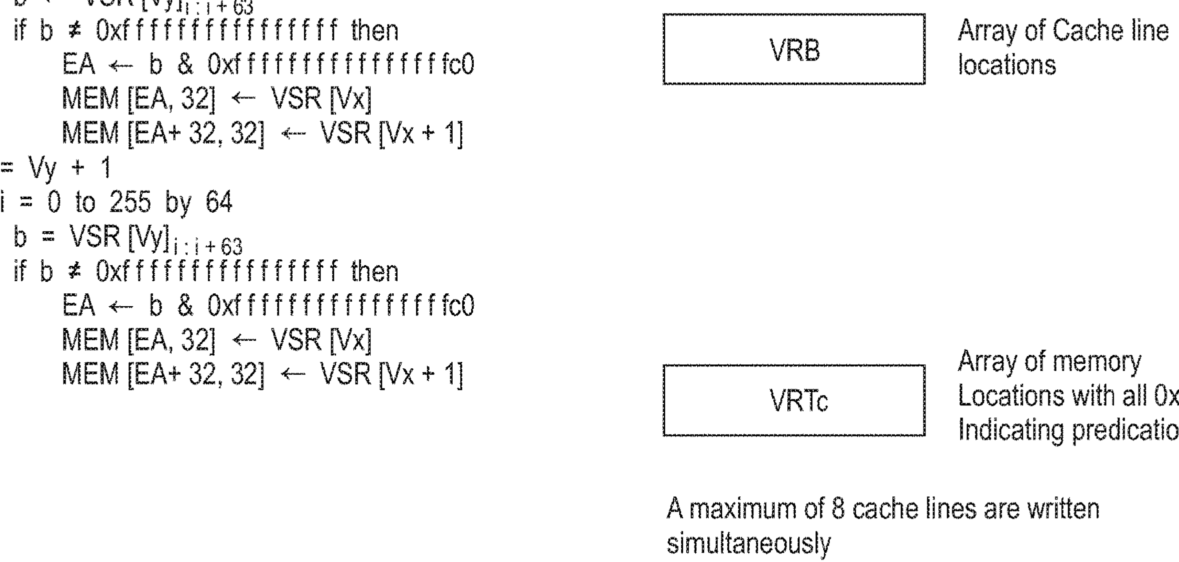

A maximum of 8 cache lines are written simultaneously

FIG. 5

IN-MEMORY/REGISTER VECTOR RADIX SORT

FIELD

The present invention relates to sorting data, and more specifically, to techniques for accelerating data sorting using parallelization and predicated instructions.

BACKGROUND

Radix sort is a sorting algorithm that sorts data with integer keys. The keys are grouped by the individual digits which share the same significant position and value. By way of example, because computers typically represent their data as electronic representations of binary numbers, processing by groups of binary digit representations can be performed. Two classifications of radix sorts can include least significant bit (LSB) and most significant bit (MSB) radix sorts.

In-place radix sort is a distribution-based sorting algorithm typically used for short numeric or string keys. In-place radix sort has an O(N) (linear) computational requirement and an O(1) (constant) memory requirement. In a computing environment, efficient parallelization of in-place radix sort can be difficult due to read-write dependency and load balancing of a recursively applied algorithm to resulting buckets of different sizes.

SUMMARY

Embodiments of the invention provide techniques for accelerating radix sort. According to an exemplary embodiment of the present invention, a computer-implemented method comprises retrieving a plurality of cache lines of data from an input buffer, wherein each cache line comprises a plurality of elements, scattering the plurality of elements of each retrieved cache line into a plurality of bins, wherein said scattering comprises using one or more vector instructions, forming a bin cache line in a corresponding one of the plurality of bins, wherein the bin cache line comprises a group of the plurality of elements which were scattered to the corresponding one of the plurality of bins, writing the bin cache line from the corresponding one of the plurality of bins to a memory, and loading the bin cache line from the memory to the input buffer.

According to another exemplary embodiment of the present invention, a computer-implemented method comprises retrieving a plurality of cache lines of data from an input buffer, wherein each cache line comprises a plurality of elements, scattering the plurality of elements of each retrieved cache line into a plurality of bins, wherein said scattering comprises using one or more vector instructions, forming a bin cache line in a corresponding one of the plurality of bins, wherein the bin cache line comprises a group of the plurality of elements which were scattered to the corresponding one of the plurality of bins, writing the bin cache line from the corresponding one of the plurality of bins to a memory using a first set of one or more predicated instructions, wherein the first set of predicated instructions are predicated based on the occupied size of the bin being greater than the size of the bin cache line, maintaining (i) a read pointer and (ii) a write pointer corresponding to cache line aligned positions in the bin, and loading the bin cache line from the memory to the input buffer using a second set of one or more predicated instructions, wherein the second set of predicated instructions are predicated based on the location in the memory of the read pointer being lower than the location in the memory of the write pointer.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 illustrates an operation for predicated cache line load, according to an exemplary embodiment of the present invention;

FIG. 5 illustrates an operation for predicated cache line write, according to an exemplary embodiment of the present invention;

DETAILED DESCRIPTION

Figure 1:
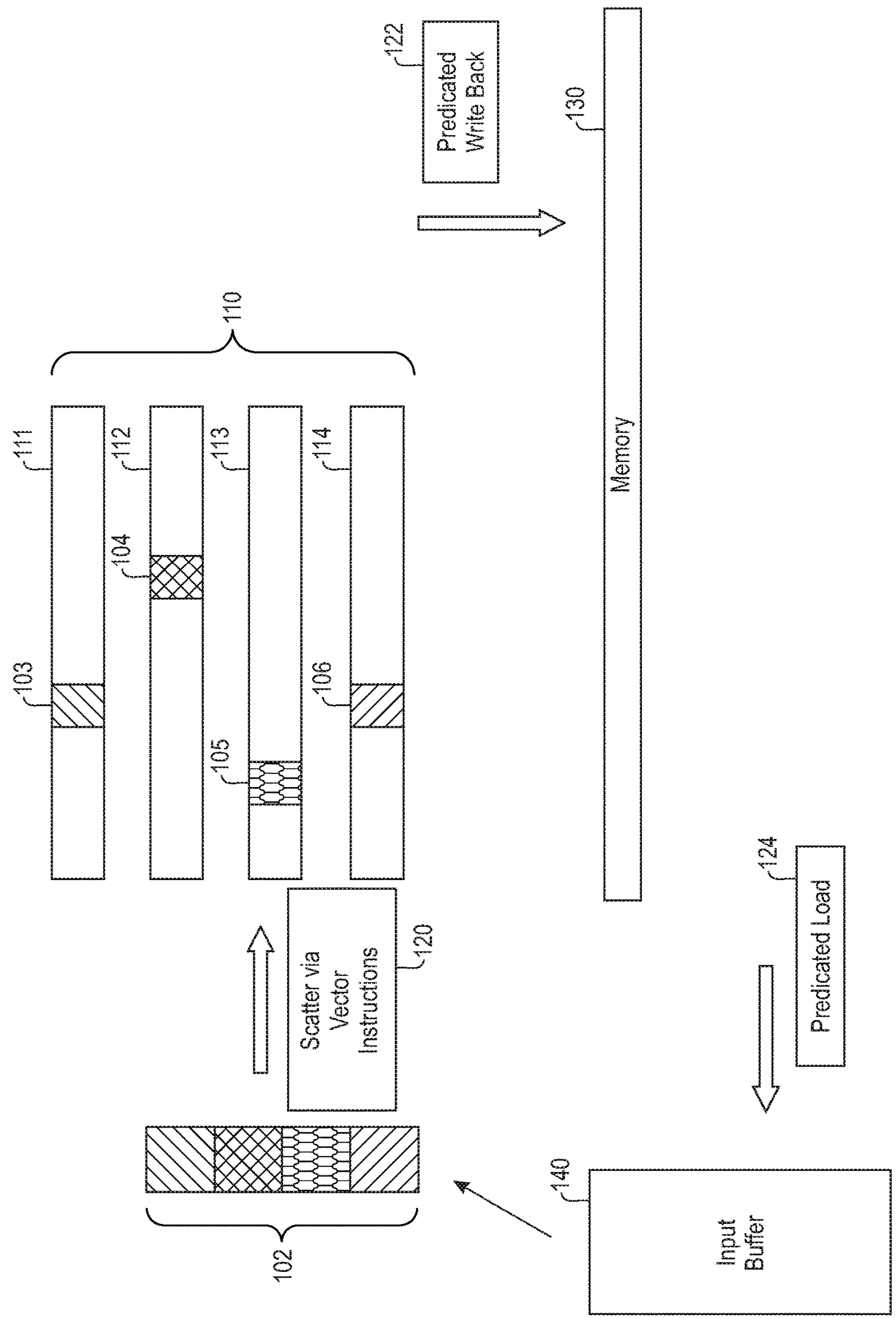
FIG. 1 is a schematic diagram illustrating a sorting algorithm, according to an exemplary embodiment of the present invention.

Illustrative embodiments of the invention may be described herein in the context of illustrative methods, systems and devices for accelerating data sorting using parallelization and predicated instructions. However, it is to be understood that embodiments of the invention are not limited to the illustrative methods, systems and devices but instead are more broadly applicable to other suitable methods, systems and devices.

In accordance with an embodiment of the present invention, a radix sort method is provided with no data-dependent branches in the core loop. This is accomplished through predicated cache line read/write instructions. In general, predication speeds up processing by removing branches from code and thereby avoiding branch mis-predictions resulting in instruction pipeline flushes.

In accordance with an embodiment of the present invention, a radix sort method also uses vector instructions, such as, for example, single instruction multiple data (SIMD) for some or all stages in the radix sort. Data parallelization can be achieved through the SIMD instructions.

Embodiments of the present invention can include taking a cache line approach to accessing data instead of an element by element approach used in conventional methods. According to an embodiment of the present invention, a register-file/on chip memory is used as a buffer to hold the cache lines, and a write back operation is performed only when a full cache line is ready. For example, a cache-line is ready when it is full, so that writing is performed only when an entire cache-line is to be written instead of writing a partial cache line. One cache line is read and written only once for one bin sorting phase.

In conventional methods using an in-place radix sort, the loop is over and/or carried out element by element and a cache line is read whenever an element in the cache line is accessed. As a result of the implementation of the cache line approach in accordance with an embodiment of the present invention, when an algorithm is implemented on multiple cores, it can be ensured that no two cores touch the same cache line. The cache line approach significantly reduces memory bandwidth utilization when compared with conventional methods.

Embodiments of the present invention, therefore, can include (1) removing data-dependent branches in the core loop when arranging the data in bins (also referred to herein as "buckets") to result in better instruction throughput when compared with conventional methods; (2) eliminating element by element processing of different elements in different cache lines, by using a cache line at a time approach with a buffer of cache lines and a corresponding managing algorithm to better utilize memory bandwidth; and (3) using vector instructions for histogram generation and when arranging the data in bins to result in faster computation when compared with conventional methods.

For example, embodiments of the present invention can also include significantly accelerating computing performance when compared to conventional methods at a given power level, or can include significantly reducing computing power requirements at given performance levels. In a non-limiting illustrative example, given the same performance, the power required for a sorting method in accordance with an embodiment of the present invention may be approximately 10 times less than the best known method on a graphics processing unit (GPU). In another non-limiting illustrative example, given the same power consumption, there may be several times performance improvement over current data warehousing platforms, and the method may be scalable to various data analytics applications.

Referring to FIG. 1, a cache line 102 of data is retrieved from an input buffer 140. The cache line 102 includes elements of data 103, 104, 105 and 106. As a non-limiting example, a cache line 102 may be 64 bytes and is divided into four 16 byte elements. However, embodiments of the invention are not limited thereto, and a cache line may include more or less data, and be divided into more or less elements. Further, cache line configurations may vary between cache lines.

With reference to the non-limiting example depicted in FIG. 1, the elements 103-106 are respectively scattered into a plurality of bins 111, 112, 113 and 114 of a buffer 110. The buffer 110 can be a register file and/or on-chip memory that includes a plurality of bins (also referred to herein as "buckets") which are locations of a pre-determined size in the buffer 110 for temporarily storing/holding data. In a non-limiting embodiment, a buffer 110 can include, for example, 256 bins for a 1 byte (8 bit) radix. However, embodiments of the invention are not limited thereto, and a buffer 110 may include more or less bins, and the bins may have more or less capacity. Further, capacities may vary between bins.

Figure 2:
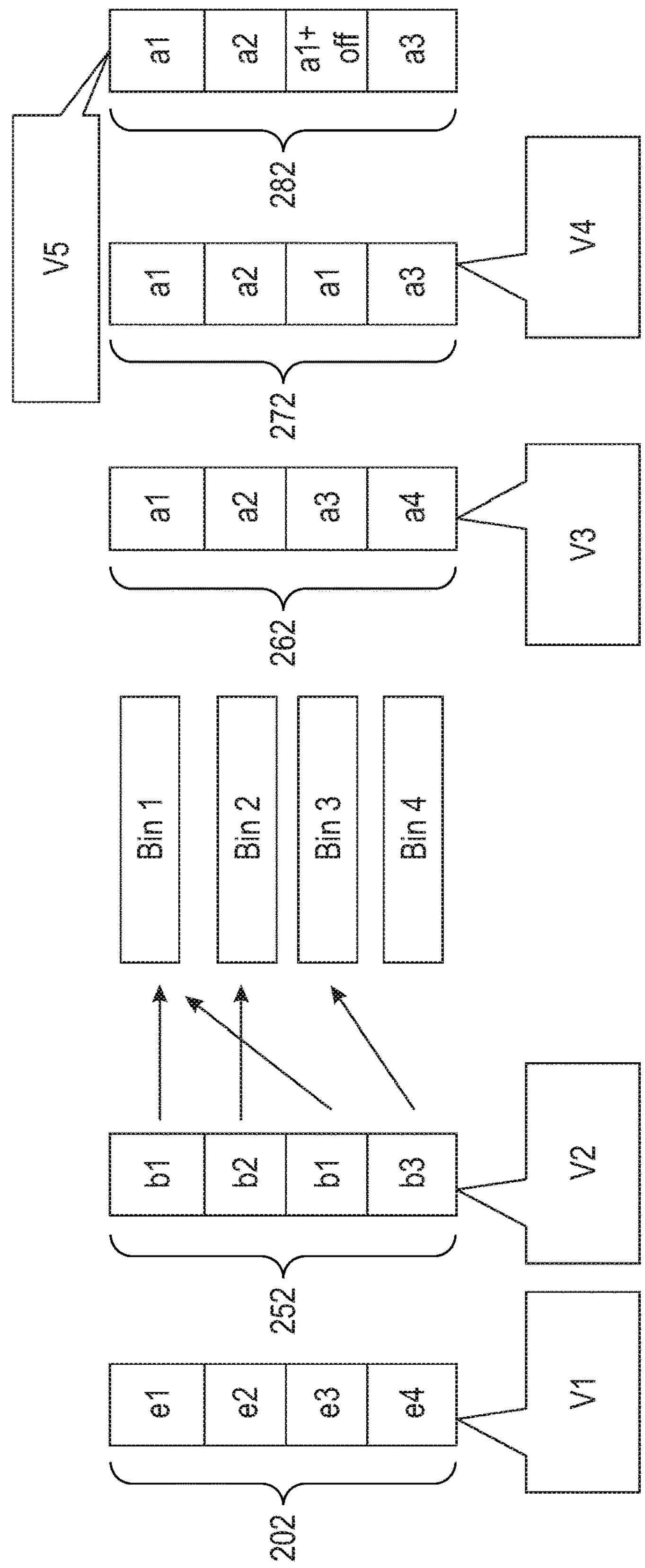
FIG. 2 is a schematic diagram illustrating a more detailed view of the sorting algorithm illustrated in FIG. 1, according to an exemplary embodiment of the present invention.

Referring to block 120 in FIG. 1, the elements 103-106 of the cache line 102 retrieved from the input buffer 140 are scattered into the bins 111-114 using vector instructions such as, for example, SIMD instructions. FIG. 2 is a diagram illustrating further detail of the scattering of elements of a cache line into a plurality of bins.

Referring to FIG. 2, a loaded cache line 202 from an input buffer includes elements e1, e2, e3 and e4. An index 252 maps the elements of the cache line 202 to particular bins b1, b2, b1 and b3 to which the respective elements e1, e2, e3 and e4 will be scattered. Bins 1, 2, 3 and 4 are shown; as can be seen, 2 elements e1 and e3 are mapped to bin 1, element e2 is mapped to bin 2, element e4 is mapped to bin 3 and no elements are mapped to bin 4. Block 262 indicates a start address of each bin, and block 272 indicates a start address of each element e1-e4 based on the bins to which elements e1-e4 are mapped. As can be seen, the start address of elements e1 and e3 is block 272 is the same because e1 and e3 are going to the same bin. Element e3 cannot overwrite element e1; therefore, the scatter write position for element e3 is the write position a1 of element v1 plus an offset, which is referenced as a1+off.

Referring again to FIG. 2, an objective can include arriving at vector V5 from the loaded cache line (vector V1) through vectors V2, V3 and V4. According to an embodiment, vector V2 can be obtained from vector V1 by a single vector operation using, for example, an SIMD instruction. Vector V3 corresponds to the start address of each bucket, and vector V4 (the start address of each element e1-e4 based on the bins to which elements e1-e4 are mapped) can be obtained from vector V2 by table look-ups using a single vector operation using, for example, an SIMD instruction. In accordance with an embodiment of the present invention, obtaining vector V5 from vectors V3 and V4 can be achieved by a vector cross compare and sequence instruction (vxcmpseqw). For example, consider vxcmpseqw VRT, VRA,VRB:

For each word in VRB, count the "rank" of the word (the number of repetitions starting from 0);

If VSR[0]=7 2 5 7 3 7 4 0, vxcmpseqw 1,0,0 gives 0 0 0 1 0 2 0 0 in VSR[1]. 7 occurs three times in VSR[0], at the $1^{st}$, $4^{th}$ and $6^{th}$ positions. The rank for the $0^{th}$ position is 0, for the $4^{th}$ position is 1 and for the $6^{th}$ position is 2, as shown by 0 0 0 1 0 2 0 0; and If VSR[0]=5 6 1 3 6 3 0 3, vxcmpseqw 1,0,0 gives 0 0 0 0 1 1 0 2 in VSR[1]. 6 occurs two times in VSR[0], namely at the $2^{nd}$ and at the $5^{th}$ positions. The rank for the $2^{nd}$ position is 0 and for the $5^{th}$ position is 1. 3 occurs three times in VSR[0], namely at the $4^{th}$, $6^{th}$ and $8^{th}$ positions, and their ranks are 0, 1 and 2, respectively, as shown by 0 0 0 0 1 1 0 2.

According to an embodiment of the present invention, a plurality of cache lines can be retrieved from the input buffer 140 and the elements thereof are respectively scattered into the plurality of bins. Bin cache lines are respectively formed in each bin from a plurality of subsets of the scattered elements. For example, a cache line in a bin can be constructed from data elements scattered from different cache lines retrieved from the input buffer 140.

Referring to block 122 in FIG. 1, a bin cache line from a bin of the plurality of bins is written to a memory 130 from the buffer 110 using predicated instructions. In accordance with an embodiment of the present invention, the predicated instructions are based on an occupied size of the bin relative to a size of the bin cache line. For example, a cache line in a bin of the buffer 110 is written to the memory 130 when an occupied size of that bin is greater than the size of the cache line than is to be written. The occupied size of the bin refers to those portions of the bin that are filled with data, and reducing the available capacity of the bin. An occupied size of the bin being greater than the size of the cache line than is to be written indicates that there is a cache line available from the bin for writing to memory.

Figure 3:
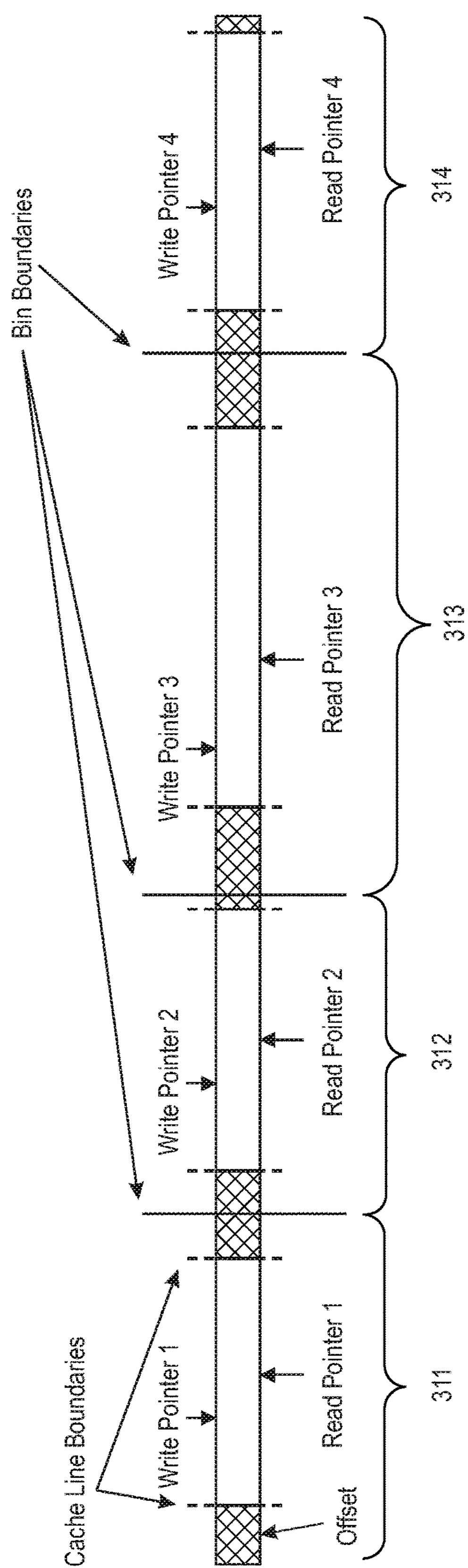
FIG. 3 is a schematic diagram illustrating bin and cache line boundaries, and read and write pointers for a plurality of bins, according to an exemplary embodiment of the present invention.

Referring to block 124 in FIG. 1, a bin cache line from the memory 130 is loaded to the input buffer 140 using predicated instructions. Referring to FIG. 3, in accordance with an embodiment of the present invention, at least one read pointer and at least one write pointer are maintained for each bin of a plurality of bins. FIG. 3 is a diagram illustrating a plurality of bins 311, 312, 313, and 314 including respective cache lines therein. As is to be appreciated, the boundaries of each cache line in a bin (illustrated by the broken vertical lines) are offset from the boundaries of their corresponding bins by an offset amount shown by the shaded regions. Each bin includes read and write pointers which correspond to, and are located within, the boundaries of the bin. These pointers point to cache line aligned positions in the bin.

In accordance with an embodiment of the present invention, a given read pointer corresponds to a location from where a bin cache line is loaded from the memory 130 to the input buffer 140, and a given write pointer corresponds to a location in the memory 130 to where the bin cache line is written. The predicated instructions used in connection with loading a bin cache line from the memory 130 to the input buffer 140 are based on a location in the memory 130 of the read pointer for the cache line to be loaded relative to a location in the memory 130 of the write pointer for the cache line to be loaded. For example, loading of the bin cache line from the memory 130 to the input buffer 140 is performed when the location in the memory 130 of the read pointer corresponding to the bin cache line is lower than a location in the memory 130 of the write pointer corresponding to the bin cache line. "Lower than," as used herein, refers to a memory location having a previous or sequentially smaller address that is encountered before another memory location during read/write operations. For example, a read pointer may be associated with a memory location 0010, and a write pointer may be associated with a memory location 0020.

Loading of a cache line from the memory 130 to the input buffer 140 is also performed when the input buffer is empty. Loading of each bin is from the memory location specified by its read pointer.

In accordance with an embodiment of the present invention, the predicated instructions used in connection with loading a bin cache line from the memory 130 to the input buffer 140 can also or alternatively be based on the input buffer being empty. As noted above, the use of the predicated instructions in connection with writing a bin cache line from a bin to memory from a buffer, and in connection with loading a bin cache line from memory to an input buffer eliminate data-dependent branches when performing the write and load operations.

FIGS. 4 and 5, respectively, illustrate operations for predicated cache line load and predicated cache line write, according to exemplary embodiments of the present invention. In connection with FIG. 4, VRTc represents pointers to loaded cache lines, and VRB represents pointers to cache lines with all ones implying to the predication. When the contents of a particular element in VRTc are all ones, then it means that the bin corresponding to that particular field is not to be loaded. This means it is predicated.

In FIG. 5, VRB represents pointers to cache lines in the register (e.g., buffer 110), and VRSc represents pointers to cache lines in registers with all ones implying to the predication.

Each of FIGS. 4 and 5 also shows VRB and VRTc in blocks and states "array of cache line locations" and "array of memory locations with all 0xf indicating predication, and "a maximum of 8 cache lines are loaded simultaneously." In other words, when the contents of a particular element in VRTc are all ones (e.g., all 0xf indicating predication), then it means that that particular field is not to be loaded. There are 8 elements in VRTc, so if no elements are predicated, 8 cache lines would be loaded.

Figure 6:
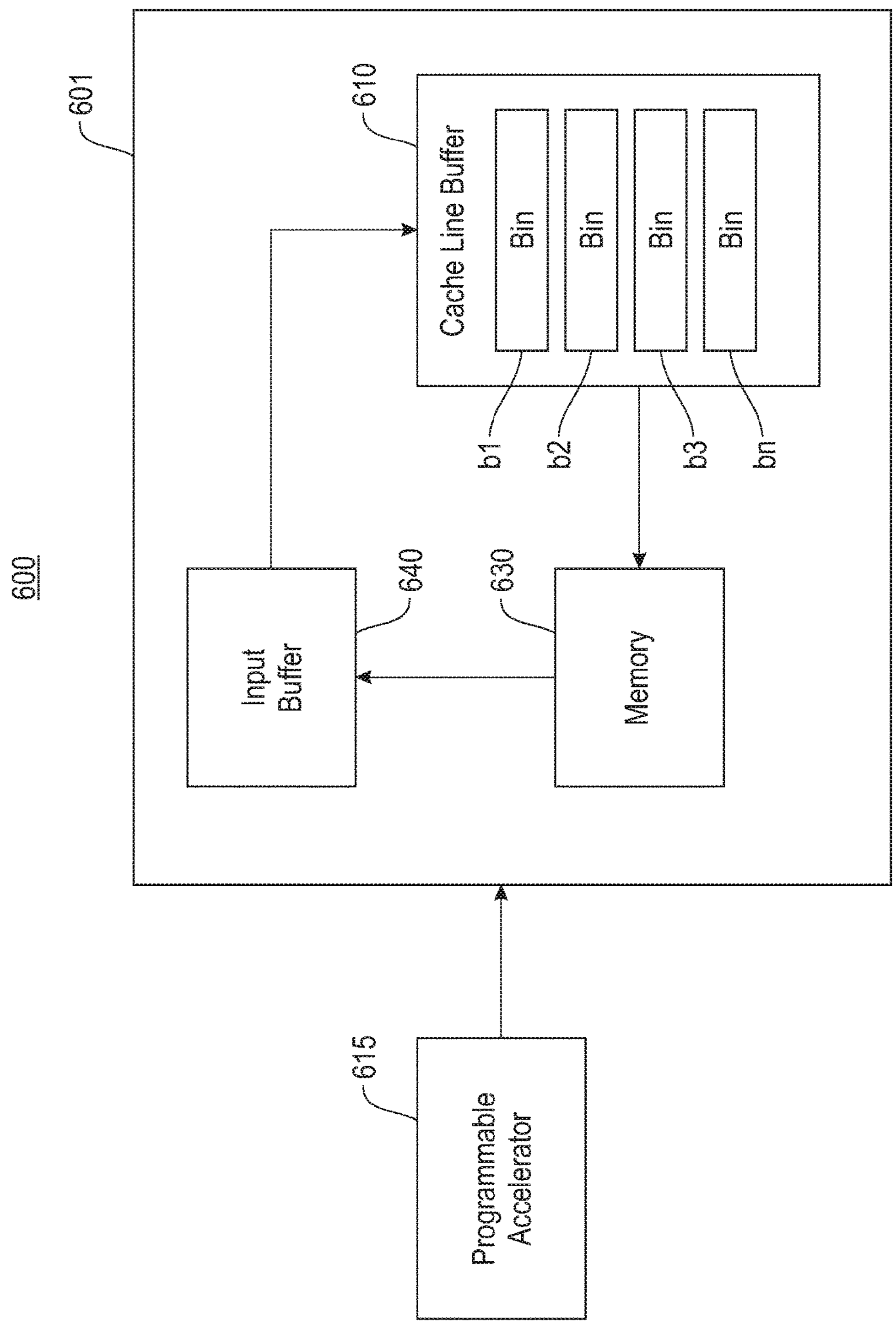
FIG. 6 depicts a system for sorting data, according to an embodiment of the present invention.

FIG. 6 is a block diagram of a system for sorting data, according to an exemplary embodiment of the present invention. As shown in FIG. 6 by lines and/or arrows, the components of the system 600 are operatively coupled to each other via, for example, physical connections, such as wired and/or direct electrical contact connections, and wireless connections, such as, for example, Wi-Fi™, BLUETOOTH®, IEEE 802.11, and/or networks, including but not limited to, a local area network (LAN), wide area network (WAN), cellular network, ad hoc networks, WANET, satellite network or the Internet.

By way of non-limiting example, in accordance with an embodiment of the present invention, referring to FIG. 6, the system 600 includes a storage device 601 including an input buffer 640, a cache line buffer 610 (also referred to a register) having bins b1, b2, b3 . . . bn (where n is a natural number), and a memory 630. The system further includes a programmable accelerator 615, such as, for example, a universal throughput accelerator (UTA), which drives the storage device, and provides the functionality for retrieving cache lines of data from the input buffer 640, scattering elements of the retrieved cache lines into the plurality of bins b1, b2, b3 . . . bn, writing bin cache lines to the memory 630 using predicated instructions, and loading bin cache lines from the memory 630 to the input buffer 640 using predicated instructions.

Figure 7:
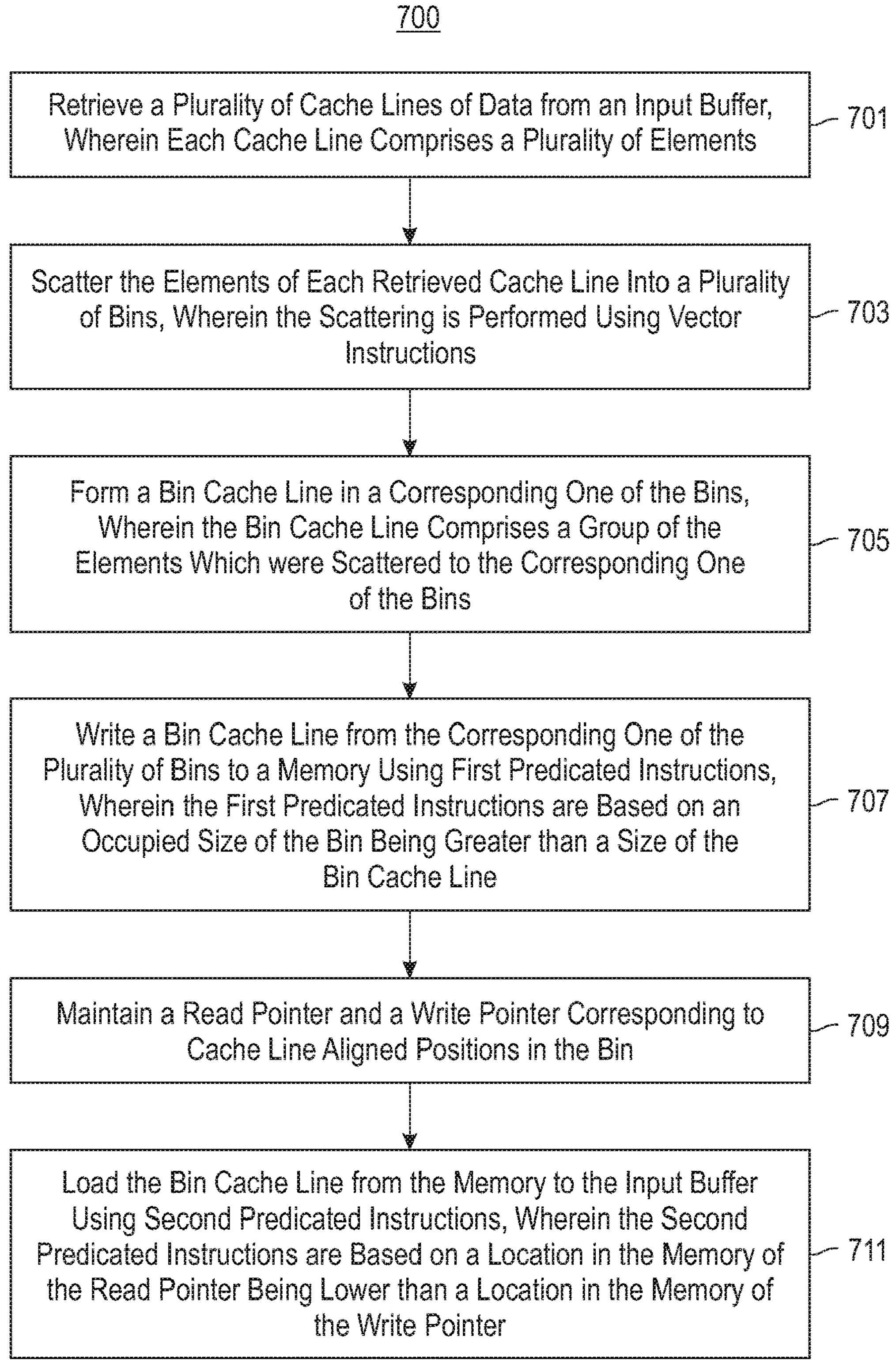
FIG. 7 depicts a process for sorting data, according to an exemplary embodiment of the present invention.

FIG. 7 is a flow diagram of a process for sorting data, according to an exemplary embodiment of the invention. Referring to FIG. 7, the process 700 includes, at block 701, retrieving a plurality of cache lines of data from an input buffer, wherein each cache line comprises a plurality of elements. Referring to block 703, the plurality of elements of each retrieved cache line are scattered into a plurality of bins. The scattering is performed using vector instructions. The method also includes, at block 705, forming a bin cache line in a corresponding one of the plurality of bins. The bin cache line comprises a group of the elements which were scattered to the corresponding one of the plurality of bins.

The method further includes, at block 707, writing a bin cache line from the corresponding one of the plurality of bins to a memory using first predicated instructions. The first predicated instructions are based on an occupied size of the bin being greater than a size of the bin cache line.

The method also includes, at block 709, maintaining a read pointer and a write pointer corresponding to cache line aligned positions in the bin, and, at block 711, loading the bin cache line from the memory to the input buffer using second predicated instructions. The second predicated instructions are based on a location in the memory of the read pointer being lower than a location in the memory of the write pointer.

The present invention may be implemented via a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
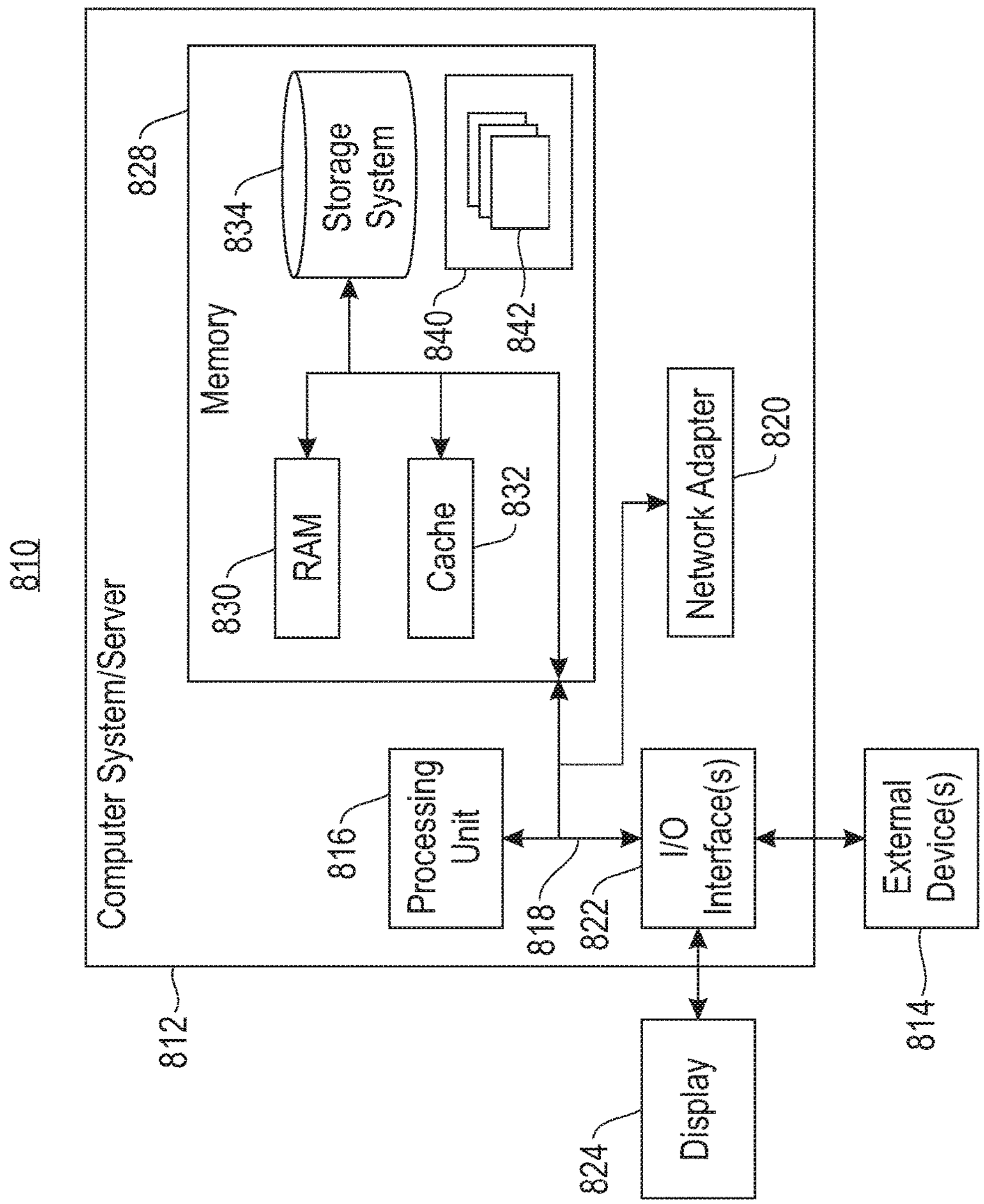
FIG. 8 depicts a computer system in accordance with which one or more components/steps of techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as RAM 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
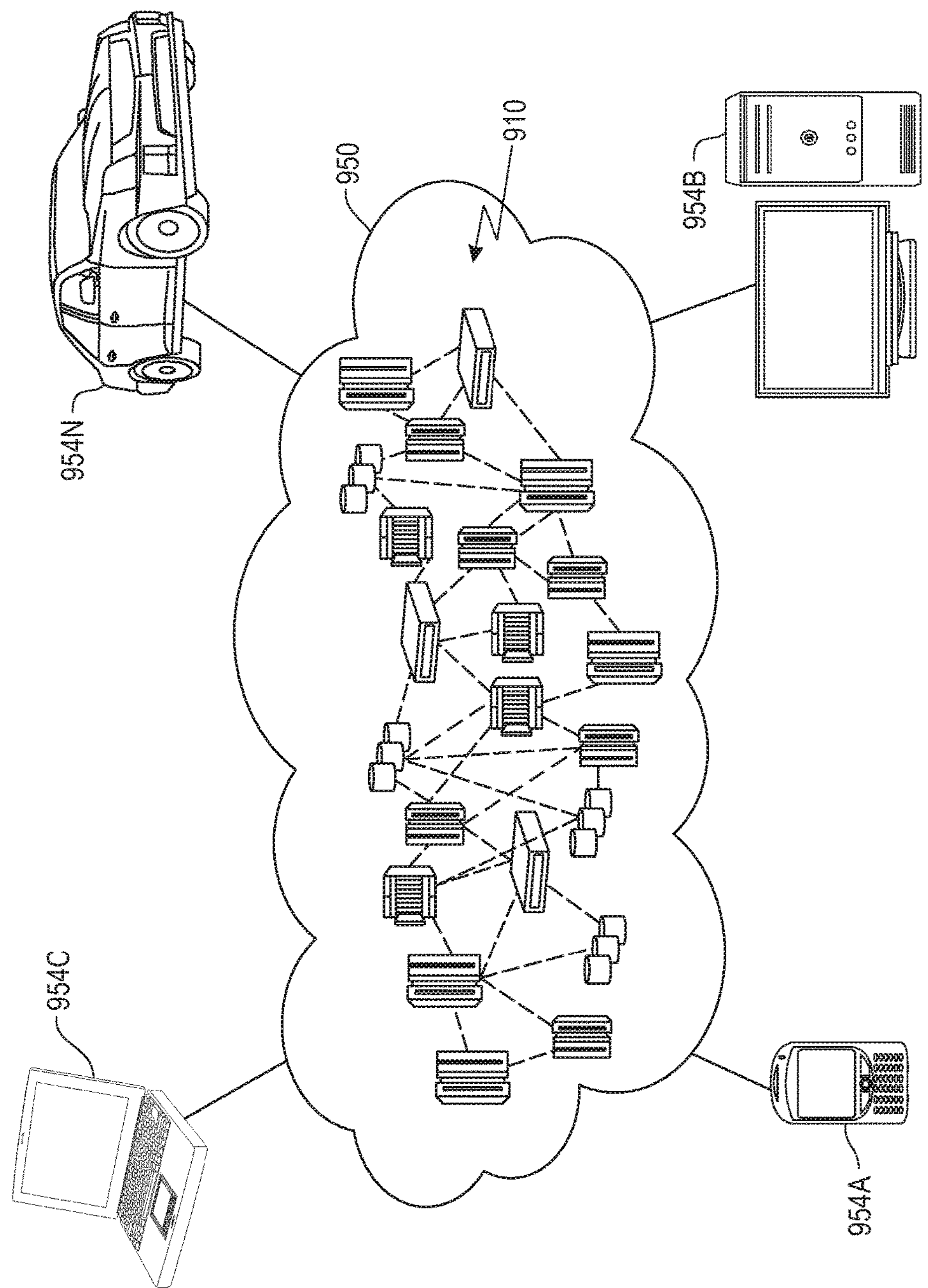
FIG. 9 depicts a cloud computing environment, according to an exemplary embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, a PDA or a cellular telephone 954A, a desktop computer 954B, a laptop computer 954C, and/or an automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 8 are intended to be illustrative only and that computing nodes 910 and cloud computing environment 950 can communicate with any type of computerized device over any type of network and/or network addressable connection (e.g., using a web browser).

Figure 10:
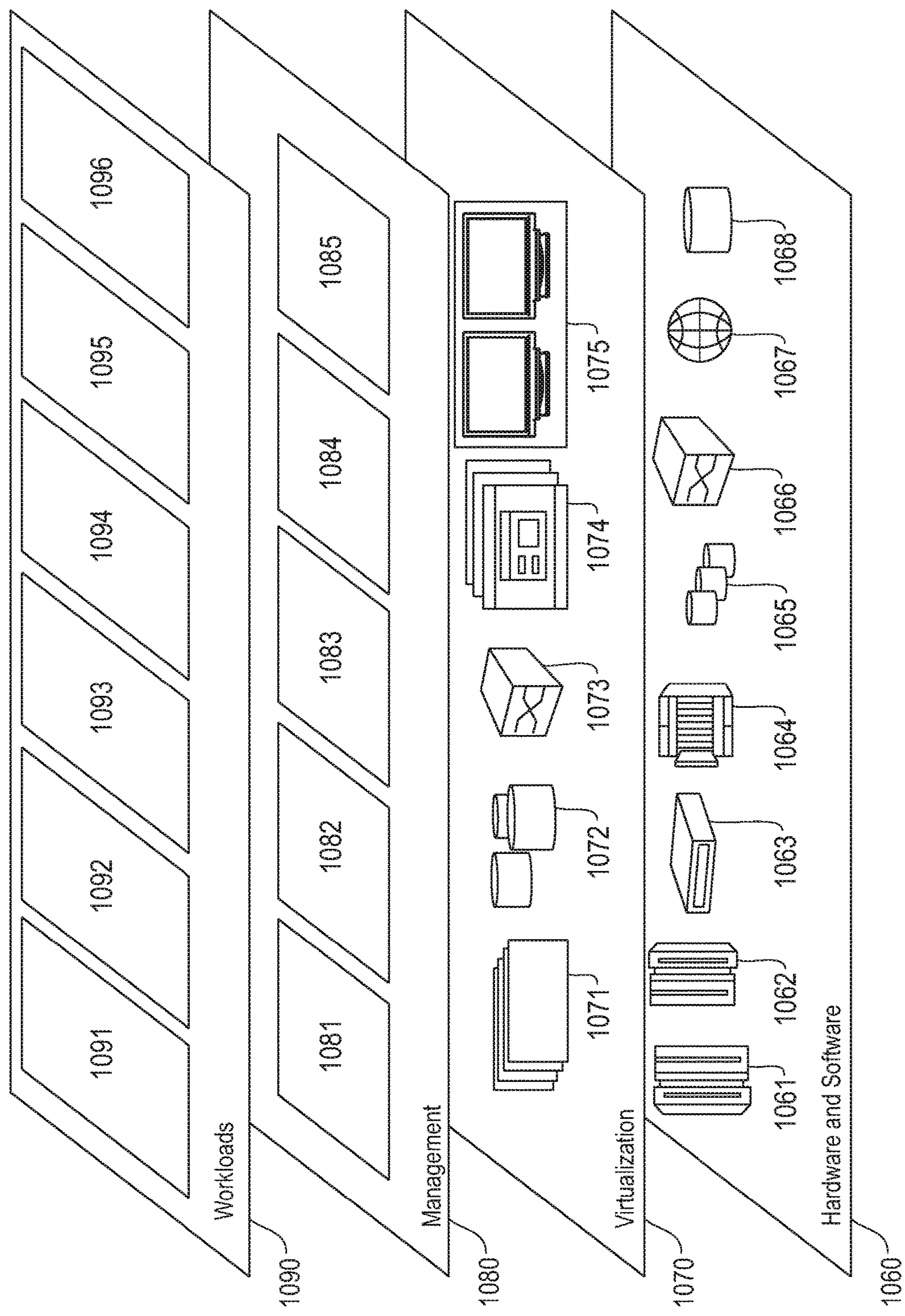
FIG. 10 depicts abstraction model layers, according to an exemplary embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and data sorting processing 1096, which may perform various functions described above with respect to system 600.

Advantageously, embodiments of the present invention significantly reduce memory bandwidth utilization when compared with conventional methods. Using predicated cache line read/write instructions, a radix sort method is provided with no data-dependent branches in the core loop. In addition, data parallelization is achieved by using vector instructions for some or all stages of the radix sort. Embodiments of the present invention also include taking a cache line approach to accessing data, wherein a register-file/on chip memory is used as a buffer to hold the cache lines, and a write back operation is performed only when a full cache line is ready, so that writing is performed only when an entire cache-line is to be written instead of writing a partial cache line. As a result, when an algorithm is implemented on multiple cores, it can be ensured that no two cores touch the same cache line.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:

retrieving a plurality of cache lines of data from an input buffer, wherein each cache line comprises a plurality of elements;

scattering the plurality of elements of each retrieved cache line into a plurality of bins, wherein said scattering comprises using one or more vector instructions;

forming a bin cache line in a corresponding one of the plurality of bins, wherein the bin cache line comprises a group of the plurality of elements which were scattered from multiple distinct cache lines among the plurality of cache lines to the corresponding one of the plurality of bins;

writing the bin cache line from the corresponding one of the plurality of bins to a memory, wherein said writing the bin cache line to the memory comprises using one or more predicated instructions, and wherein the one or more predicated instructions are predicated based on the occupied size of the bin relative to the size of the bin cache line; and loading the bin cache line from the memory to the input buffer;

wherein the steps are carried out by at least one computing device.

2. The computer-implemented method of claim 1, wherein the one or more vector instructions comprise single instruction multiple data (SIMD) instructions.

3. The computer-implemented method of claim 1, wherein said loading the bin cache line from the memory to the input buffer is performed using one or more predicated instructions.

4. The computer-implemented method of claim 3, further comprising maintaining (i) a read pointer and (ii) a write pointer corresponding to cache line aligned positions in the bin, wherein the one or more predicated instructions are predicated based on the location in the memory of the read pointer relative to the location in the memory of the write pointer.

5. The computer-implemented method of claim 1, wherein (i) said writing and (ii) said loading are performed without using data-dependent branches.

6. The computer-implemented method of claim 1, wherein said loading the bin cache line from the memory to the input buffer is performed when the input buffer is empty.

7. The computer-implemented method of claim 1, further comprising maintaining (i) at least one read pointer and (ii) at least one write pointer for each of the plurality of bins.

8. The computer-implemented method of claim 7, wherein a given one of the read pointers corresponds to the location in the memory from where the bin cache line is loaded to the input buffer.

9. The computer-implemented method of claim 8, wherein the given read pointer is aligned within boundaries of the bin.

10. The computer-implemented method of claim 7, wherein a given one of the write pointers corresponds to a location in the memory wherein the bin cache line is written.

11. The computer-implemented method of claim 10, wherein the given write pointer is aligned within boundaries of the bin.

12. The computer-implemented method of claim 7, wherein the loading of the bin cache line from the memory to the input buffer is performed when the location in the memory of a given read pointer corresponding to the bin cache line is lower than the location in the memory of a given write pointer corresponding to the bin cache line.

13. The computer-implemented method of claim 1, wherein said boundaries of the bin cache lines are offset from boundaries of their corresponding bins.

14. The computer-implemented method of claim 1, wherein said writing the bin cache line to the memory is performed when the occupied size of the bin is greater than the size of the bin cache line.

15. A computer program product, the computer program product comprising a computer readable storage medium having program instructions embodied therewith, the program instructions executable by a device to cause the device to:

retrieve a plurality of cache lines of data from an input buffer, wherein each cache line comprises a plurality of elements;

scatter the plurality of elements of each retrieved cache line into a plurality of bins, wherein said scattering comprises using one or more vector instructions;

form a bin cache line in a corresponding one of the plurality of bins, wherein the bin cache line comprises a group of the plurality of elements which were scattered from multiple distinct cache lines among the plurality of cache lines to the corresponding one of the plurality of bins;

write the bin cache line from the corresponding one of the plurality of bins to a memory, wherein said writing the bin cache line to the memory comprises using one or more predicated instructions, and wherein the one or more predicated instructions are predicated based on the occupied size of the bin relative to the size of the bin cache line; and load the bin cache line from the memory to the input buffer.

16. A system comprising:

a memory; and at least one processor coupled to the memory and configured for:

retrieving a plurality of cache lines of data from an input buffer, wherein each cache line comprises a plurality of elements;

scattering the plurality of elements of each retrieved cache line into a plurality of bins, wherein said scattering comprises using one or more vector instructions;

forming a bin cache line in a corresponding one of the plurality of bins, wherein the bin cache line comprises a group of the plurality of elements which were scattered from multiple distinct cache lines among the plurality of cache lines to the corresponding one of the plurality of bins;

writing the bin cache line from the corresponding one of the plurality of bins to a memory, wherein said writing the bin cache line to the memory comprises using one or more predicated instructions, and wherein the one or more predicated instructions are predicated based on the occupied size of the bin relative to the size of the bin cache line; and loading the bin cache line from the memory to the input buffer.

17. A computer-implemented method, comprising:

retrieving a plurality of cache lines of data from an input buffer, wherein each cache line comprises a plurality of elements;

scattering the plurality of elements of each retrieved cache line into a plurality of bins, wherein said scattering comprises using one or more vector instructions;

forming a bin cache line in a corresponding one of the plurality of bins, wherein the bin cache line comprises a group of the plurality of elements which were scattered from multiple distinct cache lines among the plurality of cache lines to the corresponding one of the plurality of bins;

writing the bin cache line from the corresponding one of the plurality of bins to a memory using a first set of one or more predicated instructions, wherein the first set of predicated instructions are predicated based on the occupied size of the bin being greater than the size of the bin cache line;

maintaining (i) a read pointer and (ii) a write pointer corresponding to cache line aligned positions in the bin; and loading the bin cache line from the memory to the input buffer using a second set of one or more predicated instructions, wherein the second set of predicated instructions are predicated based on the location in the memory of the read pointer being lower than the location in the memory of the write pointer;

wherein the steps are carried out by at least one computing device.

* * * * *